Feb. 16, 1932.　　　　　A. MOORE　　　　　1,845,982
COMBUSTION CHAMBER CONSTRUCTION
Filed Aug. 29, 1930

INVENTOR
Arlington Moore
BY
Dyke and Schuines
ATTORNEYS

Patented Feb. 16, 1932

1,845,982

UNITED STATES PATENT OFFICE

ARLINGTON MOORE, OF NEW YORK, N. Y., ASSIGNOR, BY MESNE ASSIGNMENTS, TO MAX-MOOR CORPORATION, OF NEW YORK, N. Y., A CORPORATION OF DELAWARE

COMBUSTION CHAMBER CONSTRUCTION

Application filed August 29, 1930. Serial No. 478,601.

My invention relates to combustion chamber constructions for internal combustion engines, and particularly for aviation or valve-in-head engines, employing multiple ignition, and the same has for its object to provide a construction which reduced detonation or knocking by physically controlling the heat and flame propagation to prevent the development of auto-ignition temperatures and pressures.

Another object of the invention is to provide a construction of the character specified in which a combustion chamber of a predetermined clearance volume is relatively reduced at the part thereof contiguous to the valves, and compensation in volume obtained by forming an abrupt enlargement in said part in off-set relation to the valves serving to also cause expansion of the flame wave propagated through the combustion chamber.

Another object of the invention is to provide a construction of the character specified capable of simultaneously controlling the flame propagation from two or more ignition points for reducing or preventing detonation.

Another object of the invention is to provide a construction of the character specified in which the space available for thus controlling flame propagation originating at separated points is substantially confined to that above the piston.

Figure 1:
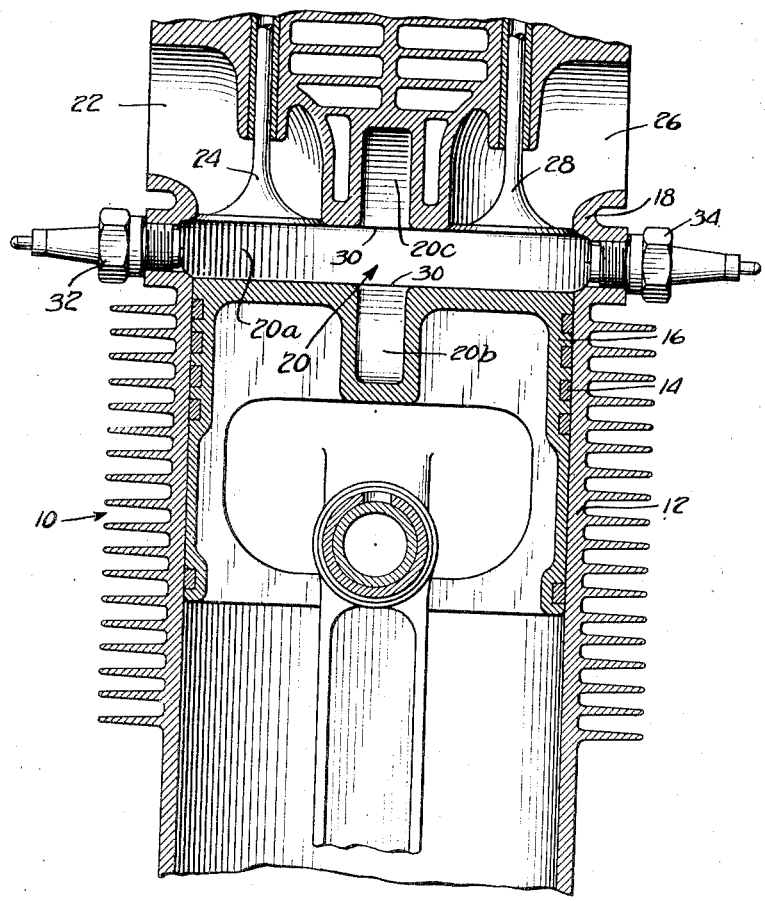
Figure 2:
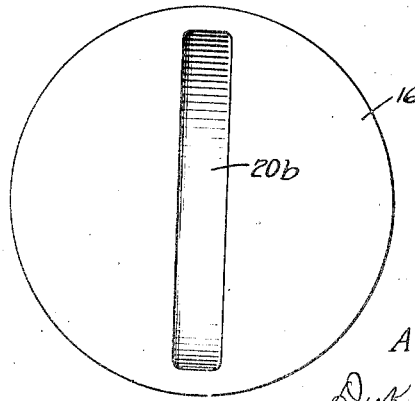

Figure 1 is a sectional elevation of one form of combustion chamber constructed according to and embodying my said invention; and Fig. 2 is a plan of the piston.

The invention relates to combustion chamber constructions in which detonating pressures are prevented by causing the flame to expand as the same is propagated, the invention residing particularly in the application of this principle to valve-in-head engines with multiple ignition.

Referring to the drawings, the engine 10 is of the valve-in-head form, such as that adapted for aviation, either of the radial or straight line type, one cylinder 12 of the several usually employed being illustrated.

The cylinder bore 14 with the piston 16 working therein is closed by a cylinder head 18, the two portions forming a combustion chamber 20 above the piston 16. The head 18 is formed with a passage 22 controlled by the inlet valve 24 for the delivery of the charge mixture into the cylinder and with a passage 26 controlled by exhaust valve 28 for the discharge of the exhaust gases from the cylinder.

The combustion chamber 20 in the top dead center position of the piston is substantially cross-shaped in configuration and includes a horizontal cylindrical portion 20ª intermediate the piston 16 and the head 18 and the transverse medial portions 20ᵇ and 20ᶜ communicating therewith in a medial plane and located respectively in the piston 16 and in the cylinder head 18.

The portions 20ᵇ and 20ᶜ are preferably semi-cylindrical in shape, providing recesses of substantially uniform width and having elongated openings or mouths 32 of ample size to prevent the trapping of the exhaust gases in the recesses and thereby preventing good scavenging.

The portion 20ª has a diameter which is substantially equal to the diameter of the piston and a depth, in the top dead center position of the piston, which provides minimum clearance in allowing full opening movement of the valves 24 and 28.

The portion or recess 20ᶜ is located between the valves 24 and 28.

Spark plugs 32 and 34 are received in the cylinder 12 at diametrically opposite points between the valves 24 and 28 and the piston 16 in the top dead center position thereof, and preferably lie on a line at right angles to the plane of the medial portions 20ᵇ—20ᶜ.

The flame waves upon the compression stroke are propagated from the ignition means 32 and 34 through the combustion chamber portion 20$^a$. The flame acceleration is initially rapid, without expansion, for a distance a little less than one-half the diameter of the piston and thereupon the wave fronts expand into the spaces 20$^b$—20$^c$ to prevent or reduce detonation. By utilizing two spark plugs, the distance traveled by the flame is comparatively short for the clearance volume.

In my invention the space 20$^a$ between the valves and the piston in which the flame waves are initially propagated is confined in depth to that necessary for proper valve opening irrespective of the total clearance volume (or compression ratio) of the combustion chamber, the remaining space necessary for obtaining a given clearance volume being formed as the expansion spaces 20$^b$ or 20$^c$, or both. That is to say, for a given clearance volume, in the absence of the portions 20$^b$ and 20$^c$, the depth of the portion 20$^a$ would have to be greater. By my invention, therefore, the desired clearance volume is obtained while providing expansion spaces for reducing detonation.

The clearance volume, and hence the compression ratio, can be varied to obtain that which is most suitable for the purpose by change in the volume of the recesses 20$b$ or 20$^c$ only without effecting any change in top dead center position of the piston or otherwise varying the depth of the part 20$^a$.

The combustion chamber 20 is disposed symmetrically relative to or equally at opposite sides of the line joining the spark plugs 32 and 34, and lies entirely within a circle having said line as a diameter. Good results in reducing detonation, while operating with relatively high compression ratios, can be obtained if the recesses 20$^b$—20$^c$, while lying wholly within said circle, form conjointly an expansion space 20$^b$—20$^c$ of a length transversely of the direction of flame propagation which is as great as or greater than the distance traveled by the flame, i. e., a distance substantially equal to one half the diameter of the piston.

It is a characteristic of my invention that while small clearance volumes or high compression ratio may be employed, nevertheless, with the small space available, detonation is effectively reduced by expansion of the flame fronts.

The incoming charge passing the valve 24 into the cylinder and the exhaust gas passing the valve 28 from the cylinder have unobstructed passage. Greater radiation of heat through the piston head and cylinder head is effected because the surface thereof is of greater area than flat surfaces would be. Further, less space is required in the cylinder head for a combustion chamber of a given compression ratio.

With the combustion chamber thus formed it is possible to operate internal combustion engines with gasoline instead of benzol blends, and to use fuels heavier than gasoline without causing detonation.

Having thus described my invention, what I claim and desire to secure by Letters Patent is:

1. In an internal combustion engine, portions forming a combustion chamber, intake and exhaust valves therein, said combustion chamber including a part contiguous to the valves having a clearance approaching the minimum required for allowing full opening movement of said valves, and a part in off-set relation to said valves forming an enlargement of said first named part and having a volume compensating for the restriction in volume of said first named part to provide a combustion chamber of predetermined clearance volume equal to the combined volumes of said parts, and ignition means in said first named part located to propagate the inflammation towards the enlarged portion, whereby to cause expansion of the flame wave thereinto for reducing detonation effects.

2. In an internal combustion engine, portions forming a combustion chamber, intake and exhaust valves therein, said combustion chamber including a part of uniform depth contiguous to the valves having a clearance approaching the minimum required for allowing full opening movement of said valves, and a part in off-set relation to said valves forming an abrupt enlargement of said first named part and having a volume compensating for the restriction in volume of said first named part to provide a combustion chamber of predetermined clearance volume equal to the combined volumes of said parts, and ignition means in the first named part located at a point remote from the enlarged portion, whereby to propagate the inflammation initially through the part of uniform depth and then suddenly expand the flame wave front at the enlarged portion for reducing detonation effects.

3. In an internal combustion engine, portions forming a combustion chamber, intake and exhaust valves therein, said combustion chamber including a part providing clearance approaching the minimum required for allowing full opening movement of the intake and exhaust valves, and a part in off-set relation to said valves forming an enlargement of said first named part, said parts conjointly forming a combustion chamber of predetermined compression ratio, and ignition means in said first named part located to propagate the flame towards the enlarged portion for causing expansion of the wave front to reduce detonation.

4. In an internal combustion engine, portions forming a combustion chamber substantially cross-shaped in cross-section.

5. In an internal combustion engine, portions forming a combustion chamber of substantially cross-shaped formation, and spark plugs in one of the combustion chamber parts at opposite sides of the part disposed transversely thereto.

6. In an internal combustion engine, portions forming a combustion chamber including a reduced part and parts extending symmetrically from opposite sides thereof at a given point to form an enlarged space, and ignition means disposed in said reduced part at a point remote from the enlarged space.

7. In an internal combustion engine, portions forming a combustion chamber having an intermediate abrupt enlargement, and ignition means therein at opposite sides of said enlargement.

8. In an internal combustion engine, portions forming a combustion chamber having an intermediate abrupt enlargement, intake and exhaust valves disposed at opposite sides of said enlargement, and spark plugs therein at opposite sides of said enlargement and said valves.

9. In an internal combustion engine, portions forming a combustion chamber, intake and exhaust valves opening into said combustion chamber, said combustion chamber having parts contiguous to said valves of substantially uniform depth and a part intermediate said valves forming an enlargement of the first named part, and spark plugs in said first named parts at points remote from said enlargement.

10. In an internal combustion engine, portions forming a combustion chamber having a reduced part and a relatively enlarged part, and ignition means in the reduced part, said enlarged part having a length transversely of the direction of flame propagation at least substantially as great as the distance of flame travel thereto from said ignition means.

11. In an internal combustion engine, portions forming a combustion chamber having a reduced part and a relatively enlarged part extending symmetrically at opposite sides of the reduced part, and ignition means in the reduced part at a point remote from the enlarged part, said enlarged part having a length transversely of the direction of flame propagation substantially greater than the distance of flame travel thereto from said ignition means.

12. In an internal combustion engine, portions forming a combustion chamber having a reduced part and an intermediate relatively abrupt enlargement, and ignition means disposed in said reduced part at opposite sides of said enlargement, said enlargement having a length transversely of the reduced part at least substantially as great as the distance of travel of the flame thereto from either ignition means.

13. In an internal combustion engine, portions forming a combustion chamber having a reduced part contiguous to the valves of substantially uniform depth and relatively enlarged parts extending outwardly at opposite sides of said reduced part at the center thereof, said parts having volumes conjointly giving a combustion chamber of predetermined clearance volume, and ignition means in said reduced part at opposite sides of the intermediate parts, said intermediate parts having a total length transversely of said reduced part at least substantially as great as the distance of flame travel thereto from either ignition means.

14. In an internal combustion engine, a cylinder, a cylinder head therefor and a piston, said head and said piston in the top dead center of the piston forming a combustion chamber having a maximum dimension substantially equal to the diameter of the piston, and having a relatively abrupt enlargement, and ignition means in said combustion chamber at a point remote from said enlargement.

15. In an internal combustion engine, a cylinder, a cylinder head therefor and a piston, said head and said piston forming a substantially cross-shaped combustion chamber, and ignition means at diametrically opposite points of said combustion chamber.

16. In an internal combustion engine, a cylinder, a cylinder head therefor and a piston, said head and said piston forming a combustion chamber including a reduced part of substantially uniform depth having a maximum dimension substantially equal to the diameter of the piston, and a part extending transversely thereto and substantially bisecting said first named part, and spark plugs located in said reduced part at opposite sides of the transverse part.

17. In an internal combustion engine, a cylinder, a cylinder head therefor and a piston, said head and said piston forming therebetween a combustion chamber of relatively reduced depth and having recesses therein forming an intermediate enlargement of the combustion chamber, and ignition means at opposite sides of said enlargement.

18. In an internal combustion engine, a cylinder, a cylinder head therefor, a piston, and intake and exhaust valves in said cylinder head, said cylinder head and said piston forming a combustion chamber including a reduced part of substantially uniform depth contiguous to said valves, and having recesses therein having elongated and relatively wide mouths and forming a symmetrical enlargement of said reduced part extending transversely thereof diametrically of the piston between said valves, said combustion chamber parts having volumes conjointly forming a combustion chamber of predetermined compression ratio, and ignition means in the reduced part of said combustion chamber at opposite sides of said enlargement, said enlargement forming an expansion space having a length transversely of the direction of flame propagation at least substantially equal to the distance of flame travel from either ignition means.

In testimony whereof, I have signed my name hereto.

ARLINGTON MOORE.